July 24, 1962

A. B. SKROMME 3,045,841

SILO UNLOADER

Filed Jan. 6, 1961

INVENTOR.
A.B. SKROMME

BY William A. Murray

ATTORNEY

July 24, 1962 A. B. SKROMME 3,045,841
SILO UNLOADER

Filed Jan. 6, 1961 3 Sheets-Sheet 2

INVENTOR.
A.B. SKROMME
BY William A. Murray
ATTORNEY

July 24, 1962     A. B. SKROMME     3,045,841
SILO UNLOADER
Filed Jan. 6, 1961     3 Sheets-Sheet 3
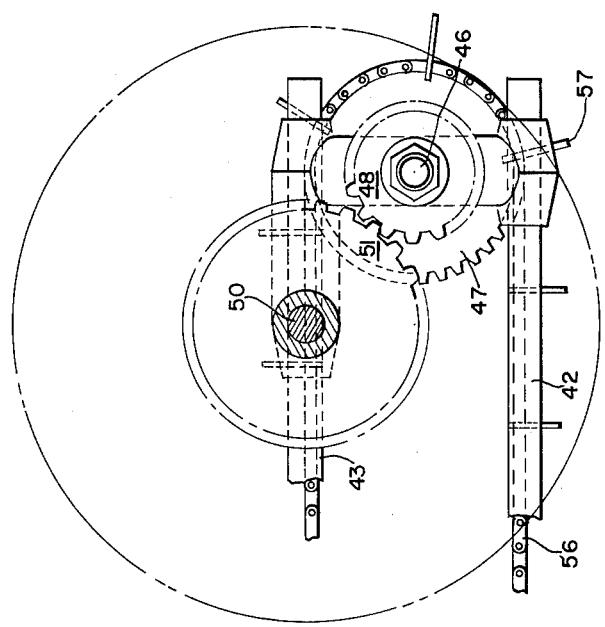
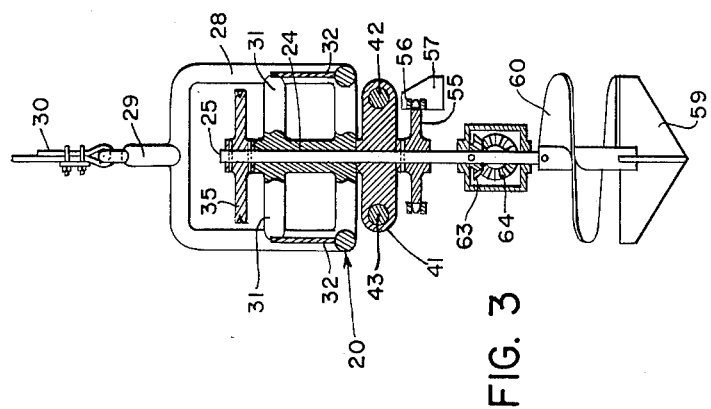
INVENTOR.
A.B. SKROMME
BY *William A. Murray*
ATTORNEY 3,045,841
SILO UNLOADER
Arnold B. Skromme, Moline, Ill., assignor to Deere & Company, Moline, Ill., a corporation of Delaware
Filed Jan. 6, 1961, Ser. No. 81,146
10 Claims. (Cl. 214—17)

This invention relates to an improved silo unloader.

The conventional type silo normally is composed of an upright cylindrical wall having a series of vertically aligned openings at one side which may be closed by doors. The openings are separated by horizontal or laterally disposed wall sections and the doors or closure members rest or abut against the horizontal sections.

In the conventional type silo unloader, there is provided a frame supported from the top of the silo and disposed adjacent the surface of the silage. Mounted on the frame is a radially disposed sweep which sweeps about the surface of the silage and operates to convey silage centrally.

It is proposed in the present invention to incorporate with the above described sweep an auger or a conveyor mounted on the frame beneath the sweep and extending radially from the center of the silo to an end adjacent the silo openings. The auger will operate to dig a trough in the surface of the silage and convey the material that is swept centrally by the sweep conveyor outwardly to a point adjacent the doors.

It is also proposed in the present invention to provide with the aforementioned auger conveyor a vertically disposed auger or conveyor which lines adjacent the discharge openings and generally depends from the end of the horizontal auger. The lower end of the vertical auger has a digging element thereon which operates to dig silage away from the opening and to elevate the dug silage. The vertical auger or conveyor will have sufficient length to bridge the expanse of the horizontal structure members or frames which separate the silage discharge openings in the side of the silo. Consequently the silage will move radially outwardly by the discharge auger and then move downwardly by the vertical auger. The doors will be removed from the openings adjacent the vertical auger and the vertical auger will operate to pass material above and below the horizontal brace or structure members separating the openings. Also, the vertical auger will tend to resist torque or movement of the radial auger about the silage.

It is further proposed in the present invention to provide a digging auger adjacent the center of the silo which clears the material from an area adjacent the center of the silo. Consequently, the vertical augers at opposite ends of the radial auger will generally anchor the latter against movement.

It is further proposed in the present invention to provide a drive mechanism which features a main power source mounted on the unloader frame which operates a main drive shaft vertically disposed and on the axis of the silo. The sweep will be composed of a continuous chain conveyor mounted over a central sprocket carried on the drive shaft and the auger conveyor will be driven by a transmission also carried on the main drive shaft. The connection between the horizontal auger conveyor and the vertical auger conveyor will consist of a bevel gear transmission which transfers the power between the two augers.

Other objects and advantages of the present invention will become apparent to those skilled in the art as the nature of the invention is better understood from the following description and as shown in the accompanying drawings.

FIGURE 3 is a sectional view taken substantially along the line 3—3 of FIG. 1.

FIGURE 4 is an enlarged sectional view taken substantially along the line 4—4 of FIG. 1.

Figure 1:
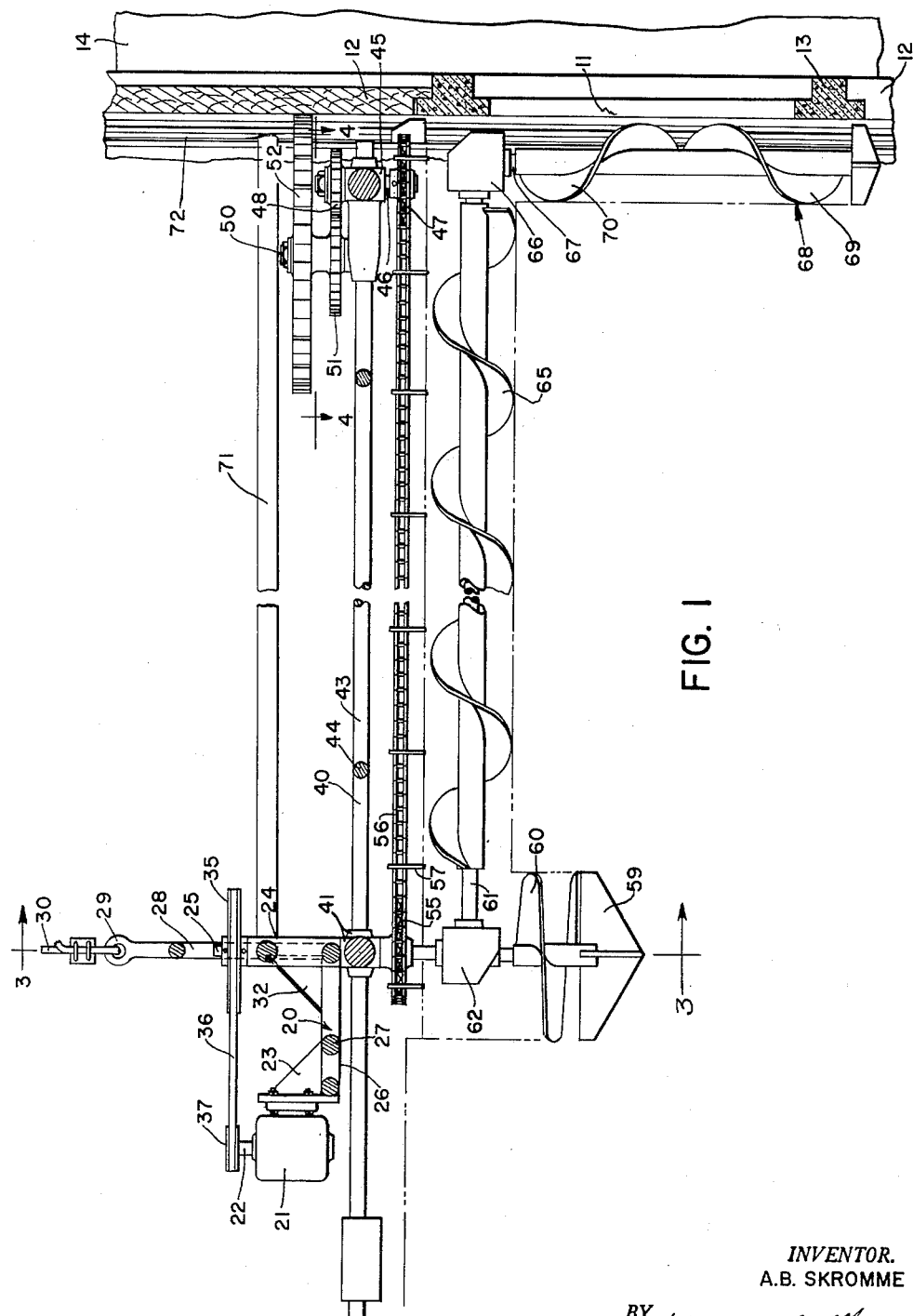
FIGURE 1 is a side view shown partially in section of the silo unloader as positioned in a silo.
Figure 2:
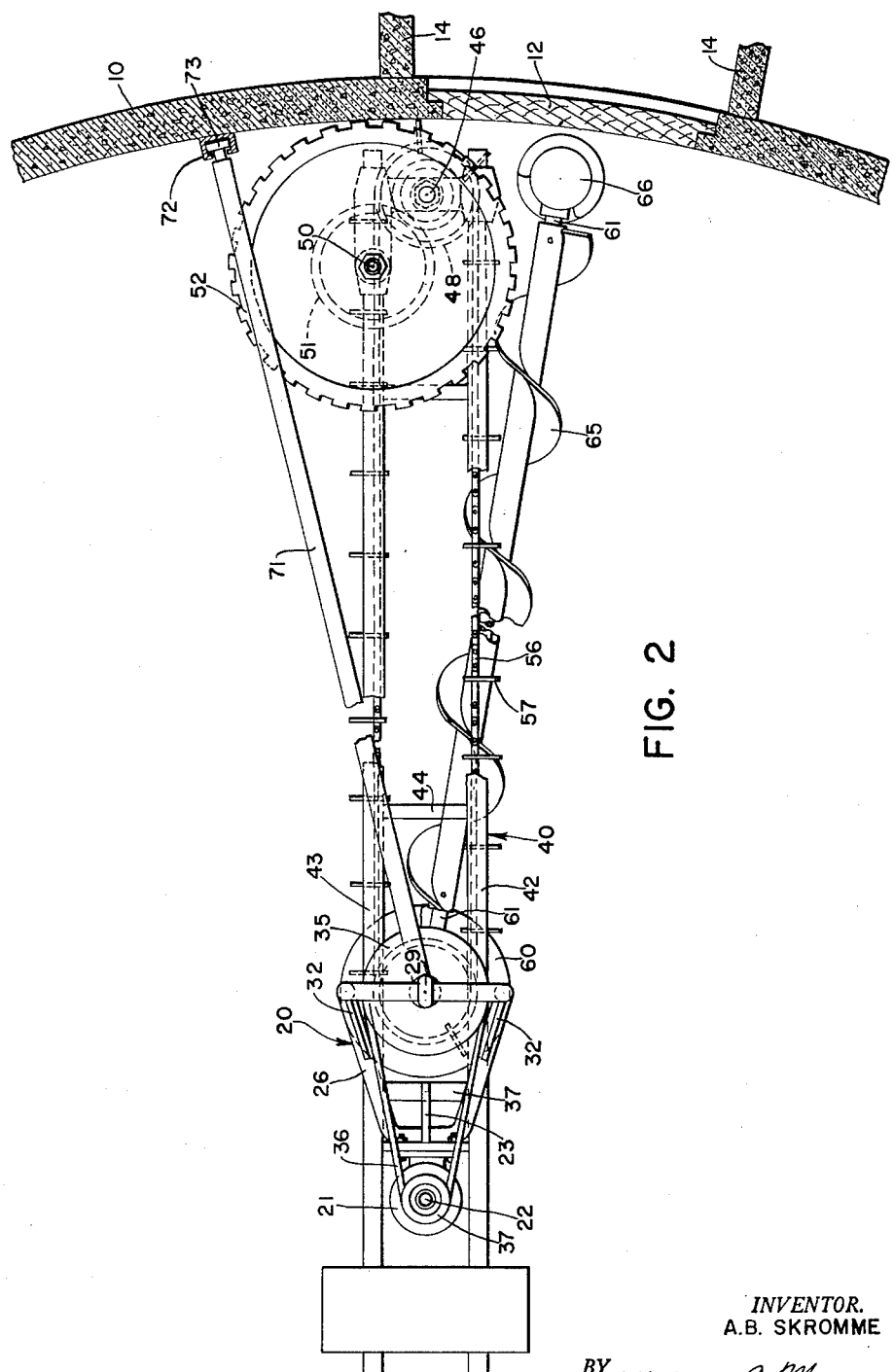
FIGURE 2 is a plan view of a silo unloader as shown in FIG. 1.

Referring now to the drawings, the silo is composed of an upright cylindrical wall 10 having at one side thereof a series of vertically aligned and vertical spaced apart discharge openings 11. Closure members or doors 12 are provided in the openings to generally close the open side of the silo. The openings 11 are separated by horizontally disposed wall structures 13 which form the upper and lower ends of the openings 11 and provide the structural strength required on the open side of the silo. Generally, the silo is of a conventional type and is provided with a vertical chute, indicated partially by wall structure 14, positioned outwardly of the wall 10 to guide materials being discharged thru the openings 11. The silo unloader is composed of a laterally disposed main frame 20 supporting an electric motor 21 having a vertical drive shaft 22 extending therefrom. The motor 21 is supported on the frame 20 by means of a strut type support 23. The frame 20 also has a vertical journal 24 supporting a main drive shaft 25 disposed closely adjacent to the vertical axis of the silo 10. The frame 20 includes a horizontally disposed U-shaped tube or pipe member 26 extending radially from the shaft 25 and is reinforced by cross braces 27. Fixed to the inner free end of the U-shaped member 26 is an upright U-shaped tube or pipe 28 with opposite leg portions thereof parallel to the shaft 25 and inner-connected by a laterally disposed bight portion which extends above the upper end of the shaft 25. Extending upwardly from the bight portion is an integral ring 29 thru which extends the lower end of a cable 30. The leg portions of the U-shaped tube 28 are braced by cross beams 31 which extend inwardly from the leg portions to the journal 24. Trusses 32 extend from the vertical leg portions of the member 28 to the horizontal leg portions of the U-shaped member 26.

Fixed to the upper end of the main drive shaft 25 is a drive pulley 35. The pulley 35 is driven by the motor 21 through means of a V-belt 36 extending over a relatively small pulley 37 fixed to the motor shaft 22. Journalled also on the shaft 25 directly beneath the main frame 20 is a sub-frame 40 which extends radially to an area adjacent the wall 10. The sub-frame 40 is journalled at 41 for relative rotation and is composed of parallel tubular members 42, 43 cross braced at 44. The frame 40 is provided with a journal 45 at its outer end which carries a vertical shaft 46 having an upper end disposed above the frame 40 and a lower end disposed below the frame. The lower end of the shaft 46 carries a sprocket 47 and the upper end carries a pinion 48. The frame 40 also supports an upwardly projecting shaft 50 having mounted thereon a relatively large gear 51 meshing with the pinion 48. The shaft 50 carries a drivewheel 52 having its outer surface in engagement with the wall 10.

Referring again to the main drive shaft 25, there is provided thereon directly beneath the sub-frame 40 a drive sprocket 55 over which is mounted a continuous chain-type conveyor 56 having radially spaced flights 57 thereon. Referring to the description of the silo unloader up to this point, as the motor 21 is operated, the drive shaft 25 will rotate to drive the conveyor 56 so that one run of the chain is driven radially inwardly and the opposite run is driven radially outwardly. The flights 57 of the run moving radially inwardly will sweep the silage into the central portion of the silo unloader. The chain 56 will also operate as a drive whereby the shaft 46 will effectively rotate the wall drive wheel 52 so that the chain or conveyor 56 is swept in an angular or rotating direction around the surface of the silage as the chain moves the silage radially inwardly. The gears 48, 51 operate as a speed reducing mechanism so that the movement of the sweep or conveyor 56 about the axis of the silo is relatively slow.

Fixed to the lower end of the main drive shaft 25 is a digging tool 59 and a short section of a vertically disposed auger 60 which operates as a digging tool and tends to move the silage directly under the shaft 25 upwardly, and also to operate to generally clear the area of the silage which is brought into the central area of the silo by the gathering chain 56. Just above the digging auger 60 is a transmission terminating in a generally horizontal radially outwardly projecting shaft 61. The transmission is composed of a housing 62 and a pair of bevel gears 63, 64, one being fixed to the shaft 25 and driving the other bevel gear 64, the latter being fixed to the aforesaid shaft 61. The shaft 61 extends radially outwardly and terminated adjacent the wall 10 of the silo. Supported on the shaft 61 is an auger flight 65 which moves the material radially outwardly.

Fixed to the outer end of the shaft 61 is a second bevelled gear transmission, indicated in its entirety by the reference numeral 66, terminating in a vertically disposed drive shaft 67. Mounted on the vertically disposed drive shaft is a vertical conveyor 68 composed of a pair of auger flights, the lower section 69 of which operates as a digging tool for moving silage upwardly, and the upper end 70 of which operates as a conveyor for moving material downwardly.

A torque arm 71 is fixed to the outer housing of the journal housing 24 and extends radially to the silo wall 10. A track 72 is fixed to the wall 10 and receives a roller guide telescopingly received in the end of the arm 71. The track 72 extends the entire height of the silo, thereby permitting free vertical movement of the silo unloader. The wheel 52 will travel over the track 72 in its rotation about the silo wall. The telescoping arrangement between the arm 71 and guide 73 will permit the center of the unloader to shift slightly as the wheel travels over the track 72.

Referring now to the operation of the silo unloader, as previously mentioned materials are swept inwardly to the central portion of the silo by means of the sweep conveyor 56 and its associated flights 57. The silage is also churned upwardly by the vertical auger section 60 and the silage is moved radially outwardly by the auger conveyor 65 until it reaches an area adjacent the wall 10. The silage then moves into the vertical conveyor 68 while at the same time the vertical conveyor operates to dig material out of the path of the conveyor 68. It will be noted that the vertical conveyor 68 is considerably longer than the vertical expanse of the structural portions 13 of the wall 10. Consequently material moving in the vertical conveyor 68 will flow out the openings 11 from a position above and/or below the structural wall members 13. Also, by digging openings by the vertical augers 60 and 68, the openings will operate as means preventing rotation of the discharge auger 65 about the surface of the silage. The discharge auger 65 will dig its own trough in the surface of the silage and the sweep conveyor 56 will be disposed to normally contact the upper surface of the silage.

In operation, it will be necessary to replace the doors 12 in the opening 11 above the surface of the silage so that the drive wheel 52 will contact the surface of the door as it passes over the respective opening 11. As is conventional in silo unloaders, the overall vertical position of the silo unloader is controlled by the cable 30 which in turn is operated from a winch, not shown, positioned outside of the silo and normally adjacent the ground.

While only one form of the invention has been shown, it should be recognized that other forms and variations will occur to those skilled in the art. Therefore, while the present disclosure was shown and described in detail for the purpose of fully and concisely illustrating the principles of the invention, it was not the intention to limit or narrow the invention beyond the broad concepts set forth in the appended claims.

What is claimed is:

1. A silo unloader for use in a silo having vertically aligned discharge openings on one side thereof, said openings being separated by horizontal wall structure, and removable closure members for said openings, said silo unloader comprising: a main frame supported in the silo above the silage; a power unit on the frame; a laterally disposed radial sweep conveyor mounted on the frame having one end adjacent the silo wall; drive means between the power unit and conveyor driving the conveyor to effect movement of silage radially inwardly and to move the conveyor over the surface of the silage; a laterally disposed radial discharge conveyor beneath the sweep conveyor having an outer end adjacent the vertically aligned discharge openings in the side of the silo and effective upon operation to cut a trench beneath the surface of the silage; a vertically disposed silage digging mechanism depending from the end of the discharge conveyor and having a lower end adapted to dig silage and being of such length as to bridge the vertical expanse of a horizontal wall structure between the openings; and drive means between the power unit and the discharge conveyor and digging mechanism effecting movement of silage radially outwardly by the discharge conveyor and vertically by the digging mechanism.

2. A silo unloader for use in a silo having vertically aligned discharge openings on one side thereof, said openings being separated by horizontal wall structure, and removable closure members for said openings, said silo unloader comprising: a main frame supported in the silo above the silage; power means on the frame; a laterally disposed radial sweep conveyor mounted on the frame having one end adjacent the silo wall; drive means associated with the power means driving the conveyor to effect movement of silage radially inwardly and to move the conveyor over the surface of the silage; discharge means including a laterally disposed radial discharge conveyor beneath the sweep conveyor having an outer end adjacent the vertically aligned discharge openings in the side of the silo and effective upon operation to cut a trench beneath the surface of the silage and a vertically disposed conveyor depending from the end of the radial discharge conveyor and having a lower end adapted to dig silage, said latter conveyor being of such length as to bridge the vertical expanse of a horizontal wall structure between the openings; and drive means between the power means and the discharge conveyors effecting movement of silage radially outwardly by the radial discharge conveyor and vertically by the vertical conveyor.

3. The invention described in claim 2 in which the radial discharge conveyor and vertical conveyor are auger conveyors at right angles to one another and having adjacent ends joined by a drive mechanism.

4. The invention described in claim 2 in which the vertical conveyor has its lower end portion adapted to dig silage and to move the silage upwardly, and the portion of the vertical conveyor above the lower end portion is adapted to receive silage from the laterally disposed discharge conveyor and to move it downwardly.

5. The invention described in claim 2 in which the drive means includes a vertically disposed driveshaft at the center of the silo and rotatably driven by the power means, a chain sprocket carried on the shaft, and a gear transmission beneath the sprocket terminating in a drive at right angles to the shaft; the sweep conveyor is a chain mounted on and driven by the sprocket; the radial conveyor is an auger driven from the terminal end of the transmission; and the vertical conveyor is an auger interconnected to and driven by the radial conveyor.

6. A silo unloader for use in a silo having a discharge opening on one side thereof, comprising: a main frame supported in the silo above the silage; a power unit on the frame; a laterally disposed radial sweep conveyor mounted on the frame having one end adjacent the silo wall; drive means between the power unit and conveyor driving the conveyor to effect movement of silage radially inwardly and to move the conveyor over the surface of the silage; a laterally disposed radial discharge conveyor beneath the sweep conveyor having an outer end adjacent the discharge opening in the side of the silo and effective upon operation to cut a trench beneath the surface of the silage; a vertically disposed silage digging mechanism depending from the outer end of the discharge conveyor; and drive means between the power unit and the discharge conveyor and the digging mechanism.

7. A silo unloader for use in a silo having a discharge opening on one side thereof, comprising: a main frame supported in the silo above the silage; a power unit on the frame; a laterally disposed radial sweep conveyor mounted on the frame having one end adjacent the silo wall; drive means between the power unit driving the conveyor to effect movement of silage radially inwardly and to move the conveyor over the surface of the silage; a laterally disposed radial discharge auger beneath the sweep conveyor having an outer end adjacent the discharge opening in the side of the silo and effective upon operation to cut a trench beneath the surface of the silage; vertically disposed auger means depending from the outer end of the discharge auger; and drive means between the power unit and the discharge auger and auger means.

8. The invention described in claim 7 further characterized by a centrally located digging mechanism mounted on the frame and effective to dig a vertical opening from the top of the silage, said digging mechanism and said vertical auger means thereby being effective to prevent radial displacement of the radial discharge auger.

9. A silo unloader for use in a silo having a discharge opening on one side thereof, comprising: a main frame supported in the silo above the surface of material in the silo; a laterally disposed radial sweep conveyor mounted on the frame having one end adjacent the silo wall effective to move material radially inwardly and to move the conveyor over the surface of the material; a laterally disposed radial discharge conveyor beneath the sweep conveyor having an outer end adjacent the discharge opening in the side of the silo and effective upon operation to cut a trench beneath the surface of the material; a vertically disposed material digging mechanism depending from the outer end of the discharge conveyor; and drive means on the frame for operating the sweep conveyor, discharge conveyor, and digging mechanism.

10. The invention defined in claim 9 in which the sweep conveyor is a continuous chain type conveyor mounted on sprockets adjacent the center end wall of the silo respectively and supported on vertical shafts, the power means includes a power unit on the frame drivingly connected to the vertical shaft adjacent the center; and further characterized by a wall drive including a laterally disposed traction wheel supported on the main frame and engaging the wall of the silo, and a drive extending from the vertical shaft adjacent the wall to the traction wheel whereby the wheel and chain conveyor will be driven in unison.

References Cited in the file of this patent
UNITED STATES PATENTS

| | | |
|---|---|---|
| 2,445,056 | Gordis | July 13, 1948 |
| 2,858,033 | Hofer | Oct. 28, 1958 |
| 2,890,804 | Smith | June 16, 1959 |

FOREIGN PATENTS

| | | |
|---|---|---|
| 1,088,874 | Germany | Sept. 8, 1960 |